United States Patent [19]
White

[11] 3,757,326
[45] Sept. 4, 1973

[54] LOW ANGLE TRACKING SYSTEM

[75] Inventor: Warren D. White, Northport, N.Y.

[73] Assignee: The United States of America as represented by the Secretary of the Navy, Washington, D.C.

[22] Filed: Dec. 21, 1971

[21] Appl. No.: 210,331

[52] U.S. Cl............................. 343/7 A, 343/16 M
[51] Int. Cl............................................. G01s 9/22
[58] Field of Search ......................... 343/7 A, 16 M

[56] References Cited
UNITED STATES PATENTS

| | | | |
|---|---|---|---|
| 3,213,447 | 10/1965 | Burrows et al. | 343/7 A |
| 3,229,283 | 1/1966 | Hefter et al. | 343/16 M X |
| 3,618,093 | 11/1971 | Dickey | 343/16 M X |

Primary Examiner—T. H. Tubbesing
Attorney—R. S. Sciascia, Q. E. Hodges et al.

[57] ABSTRACT

A radar array is aimed to receive a signal directly reflected from a target as well as an image signal reflected from the target and from the adjoining ground surface or sea surface. An ambiguity introduced in the direct signal by the image signal, is resolved by a system which includes independent steering means and beam forming networks to form sum and difference signals from the image and the direct signals. These signals are mixed by computer controlled mixing networks to provide modified sum and difference signals. When the antenna pointing angle coincides with the target elevation angle, the modified direct sum and difference signals are uncontaminated by the image signals and vice versa. A composite error signal is obtained from the modified signals whose polarity is an indication of the error of the pointing angle. This signal is used to drive the steering mechanism into alignment with the direct path where a zero or null error signal is produced corresponding to the correct elevation angle of the target.

27 Claims, 3 Drawing Figures

LOW ANGLE TRACKING SYSTEM

BACKGROUND OF THE INVENTION

Conventional monopulse radar tracking equipment suffers severe degratation of tracking accuracy when tracking targets at low angles. This is due to interference between the direct reflected radar signal and the reflected image signal transversing a bounce path off the earth or sea surface. This effect becomes more serious when the target is within a beam width of the horizon and when both signals fall within the main beam.

For example, where targets are close to the water, the direct signal and the image signal are symmetrically displaced about the horizon. A path length difference exists between the image and direct path which is a calculatable function of antenna height and elevation angle with the image path being the longer. The amplitude of the image signal therefore tends to be less than the amplitude of the direct signal.

Conventional monopulse radar systems are incapable of distinguishing between the direct reflected signal and its image signal, creating ambiguity in the display.

SUMMARY OF THE INVENTION

Signals to be distinguished consist of the direct signal reflected from the target and image signal also directly reflected from the target but bounced off the earth or sea surface and symmetrically displaced about the horizon with respect to the direct signal.

The elements of a radar array are connected to a grouping of phase shifters which independently steer each element of the array so each element is boresighted above and below the horizon by equiangular amounts and the steered direct path angle is symmetrical about the horizon with the steered image path angle.

The outputs of these phase shifters are connected to beam forming networks which combine the raw input signal into sum and difference signals. Two beam forming networks are employed; one referenced to the direct reflected signal and the other to the image signal. The direct beam forming network output comprises a direct sum (DS) and a direct difference (DD) signal and the image beam forming output comprises a direct image sum (DIS) signal and a direct image difference (DID) signal.

The direct image sum (DIS) signal is attenuated to an amplitude equal to the direct sum (DS) pattern at the steered image angle. The array is steered toward the target at an assumed target path angle. The asumed angle path is then symmetrical about the horizon with respect to the steered and assumed direct target angle path. The attenuated image sum is subtracted from the direct sum (DS), yielding the modified direct sum (MDS) pattern which has a null at the steered image angle. The modified image sum (MIS) is obtained by attenuating the direct sum (DS) amplitude so it is equal to the direct image sum (DIS) amplitude at the assumed direct angle. Subtracting the attenuated direct sum from the direct image sum (DIS) yields the modified image sum (MIS). The modified image sum (MIS) is then attenuated to be equal in amplitude to the direct difference (DD) signal amplitude at the assumed image angle. Subtracting the attenuated modified image sum (MIS) signal from the direct difference (DD) signal yields the modified direct difference (MDD) pattern. Similarly, the modified direct sum (MDS) is attenuated to be equal in amplitude to the direct image difference (DID) amplitude at the assumed direct angle and subtracted from it to yield the modified image difference (MID).

The modified direct sum (MDS) signal possesses a null at the assumed image angle and the modified direct difference (MDD) signal and the modified image difference (MID) possess nulls at both the direct and image angles. The modified image sum (MIS) possesses a null at the assumed direct angle. When the assumed elevation angle does in fact coincide with the actual elevation angle of the target there will be no signal at the modified direct difference (MDD) port and the modified direct sum will only contain the sum signal, corresponding to an error null signal condition.

The modified image difference (MID) and the modified image sum (MIS) signals are phase detected as are the modified direct sum (MDS) and the modified direct difference (MDD) signals. The output of each detector goes to zero when the pointing angle of the array corresponds to the actual angle of the target. These phase detector signals are used to drive the elevation servos and the steering computer which in turn controls the attenuation of the direct image sum, the direct sum, the modified direct signals, and the modified image signals.

Precise attenuation of the direct and image signals to obtain the expected nulls is controlled by the steering computer. The computer is programmed with known response of the antenna to image and direct signals within its angular range. The signals received are then attenuated according to the response characteristic of the antenna to signal on the antenna when the antenna is pointed in an assumed direct path at the target or according to the response characteristic of the antenna to a direct signal on the antenna when it is pointed in the assumed image path.

DESCRIPTION OF THE PREFERRED EMBODIMENT

Figure 1:
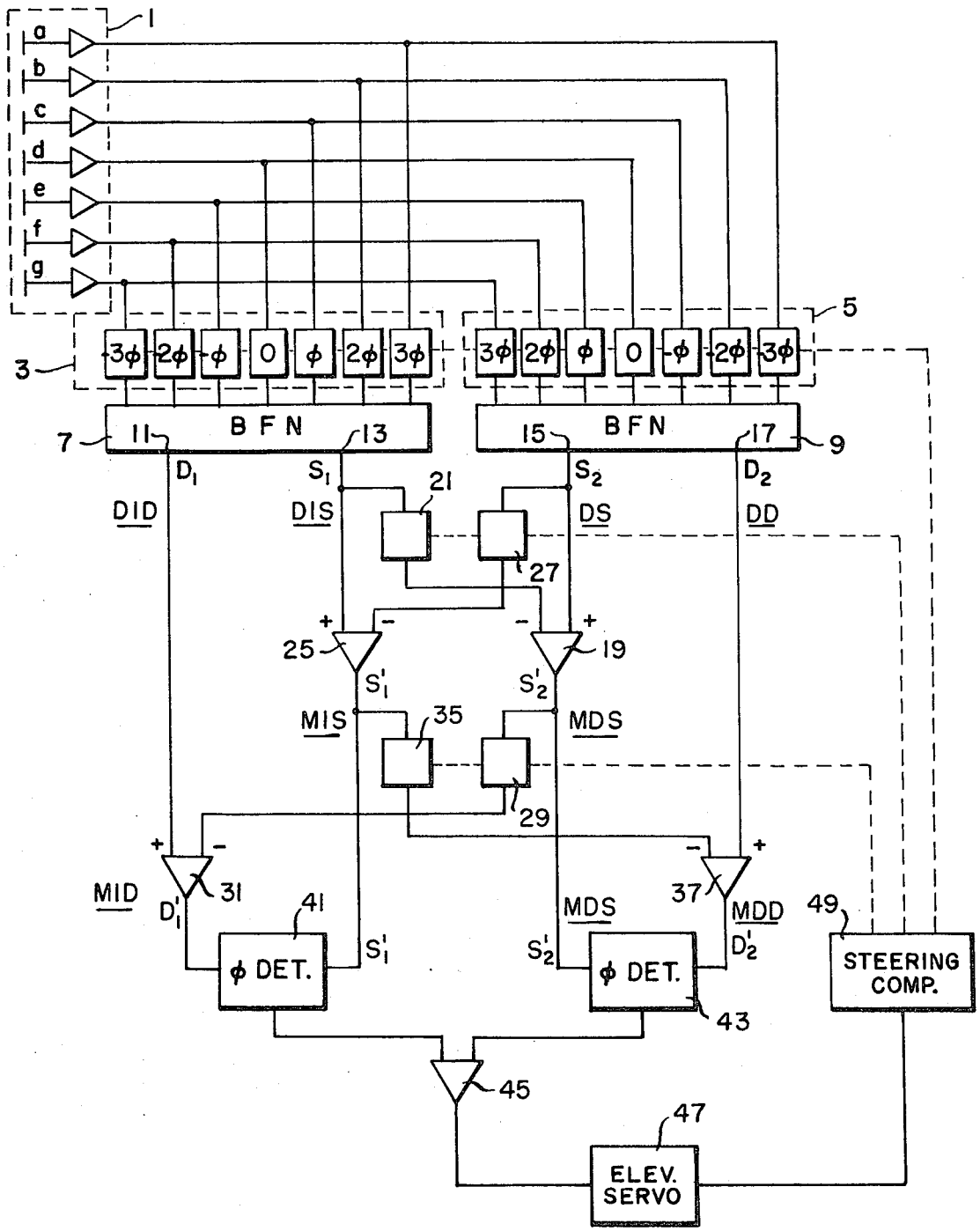
FIG. 1 shows an ideal low-angle tracking system employing independent steering and separate beam forming networks in the image and direct path signals and wherein the modified image difference (MID) and modified image sum (MIS) signals are separately phase detected from the modified direct sum (MDS) and the modified direct difference (MDD) signals to obtain the angle error signal.

An array antenna 1 is composed of elements $a$–$g$. Each of the elements is connected in parallel to a respective phase shifter in phase shift bank 3 and phase shift bank 5. The phase shifters, in each of the banks 3 and 5, connected to respective elements, provide equal and opposite amounts of phase shift so the antenna array is boresighted above and below the horizon in equal amounts (i.e., antenna element $g$ is connected to beam forming network 7 through $-3\phi$ phase shift and connected to beam forming network 9 through a phase shift of $+3\phi$). The beam forming networks 7 and 9 are used to derive the sum and difference components of the received wave. Each beam forming network is shown as having two output ports, 11 and 13 for beam forming network 7, and 15 and 17 for beam forming network 9. The phase shifters within phase shift bank 3 are designed to effectively steer the array below the horizon toward the assumed image signal while the phase shift bank 5 is designed to effectively steer the array at the assumed direct elevation angle of the target. The amount or degree of phase shift controls the steering angle of the array and is increased or decreased in accordance with the elevation angle of the target.

Port 11 of beam forming network 7 has a signal output which is the direct image difference (DID) signal D1. Port 13 signal output is the direct image sum (DIS) signal S1. Beam forming network 9, associated with the direct signal, has a signal output S2 at port 15 identified as the direct sum (DS) and the signal output D2 at port 17 is the direct difference (DD).

The modified direct sum signal S2' is produced by connecting the direct sum signal S2 from port 15 to the positive terminal of differential amplifier 19. The direct image sum signal S1 at port 13 is connected to the negative terminal of differential amplifier 19 through attenuator 21. Attenuator 21 reduces the amplitude of the direct image sum signal S1 to be equal to a direct sum signal received at the assumed image angle by an antenna aligned in the direct signal path. The output of differential amplifier 19 is the modified direct sum (MDS) signal S2'.

In a similar manner the direct image sum signal S1 from port 13 is connected to the positive terminal of differential amplifier 25. The direct sum signal S2 from port 15 is connected to the negative terminal of amplifier 25 through attenuator 27. Attenuator 27 is used to reduce the amplitude of the direct sum signal to equal the amplitude of the direct image signal received at the assumed direct angle by an array aligned in the assumed image signal path. comprises In the same manner the modified direct sum signal S2' is attenuated by attenuator 29 and connected to the negative terminal of differential amplifier 31 while the positive terminal of differential amplifier 31 is connected to the direct image difference (DID) signal D1 from port 11. S2' is attenuated by attenuator 29 to be equal in amplitude to D1, the direct image difference signal received at the assumed direct elevation angle by an antenna aligned with the assumed image angle. The output of the differential amplifier 31 is the modified image difference signal D1'.

The modified image sum signal S1' is attenuated by attenuator 35 to equal the direct difference signal D2 received at the assumed image angle by an antenna aligned with the direct elevation angle. The attenuated modified image signal S1' is connected to the negative terminal of amplifier 37 and the direct difference signal D2 is connected to the positive terminal of amplifier 37 to produce the modified direct difference signal D2'.

The modified image difference signal D1' and the modified image sum signal of S1' are both connected to phase detector 41 which produces a D.C. signal which goes to zero or nulls when the reflecting array 1 is steered at the target and at the correct target angle. When the steered angle coincides with the true target elevation angle, the modified sum and difference signals S2' and D2' are uncontaminated by the image signal and the modified image sum and difference signals, S1' and D1' are uncontaminated by the direct signal.

Similarly, the modified direct difference signal D2' and the modified direct sum signal S2' are connected to phase detector 43 which goes to zero or nulls when the array is pointed at the true elevation angle.

An error signal produced by amplifier 45 is connected through elevation servo 47 to steering computer 49. The steering computer, in response to the error signal, controls the phase of each of the phase shifters in banks 3 and 5 respectively and changes the phase accordingly to change the steering direction of the array, repointing it at a new assumed target angle, and finally pointing it at the true angle, when the error signal is nulled or zero.

The steering computer similarly controls each of the attenuators 21, 27, 29, and 35. The computer 49 is programmed with the antenna response pattern. The antenna response in relation to the angle of the received signal is a known quantity and when the target is off the antenna boresight, the angular difference is indicated by the polarity and amplitude of the error signal. Computer 47 then adjusts the phase shifters and the steering direction and the attenuation characteristics of each of the attenuators accordingly in a functional relationship with the antenna response pattern so that the amplitude of the image signal is made to equal the amplitude of a direct signal received at the image angle and the amplitude of the direct signal is made to equal the amplitude of an image signal received at the direct angle, in accordance with the foregoing description.

ALTERNATIVE EMBODIMENT

Figure 2:
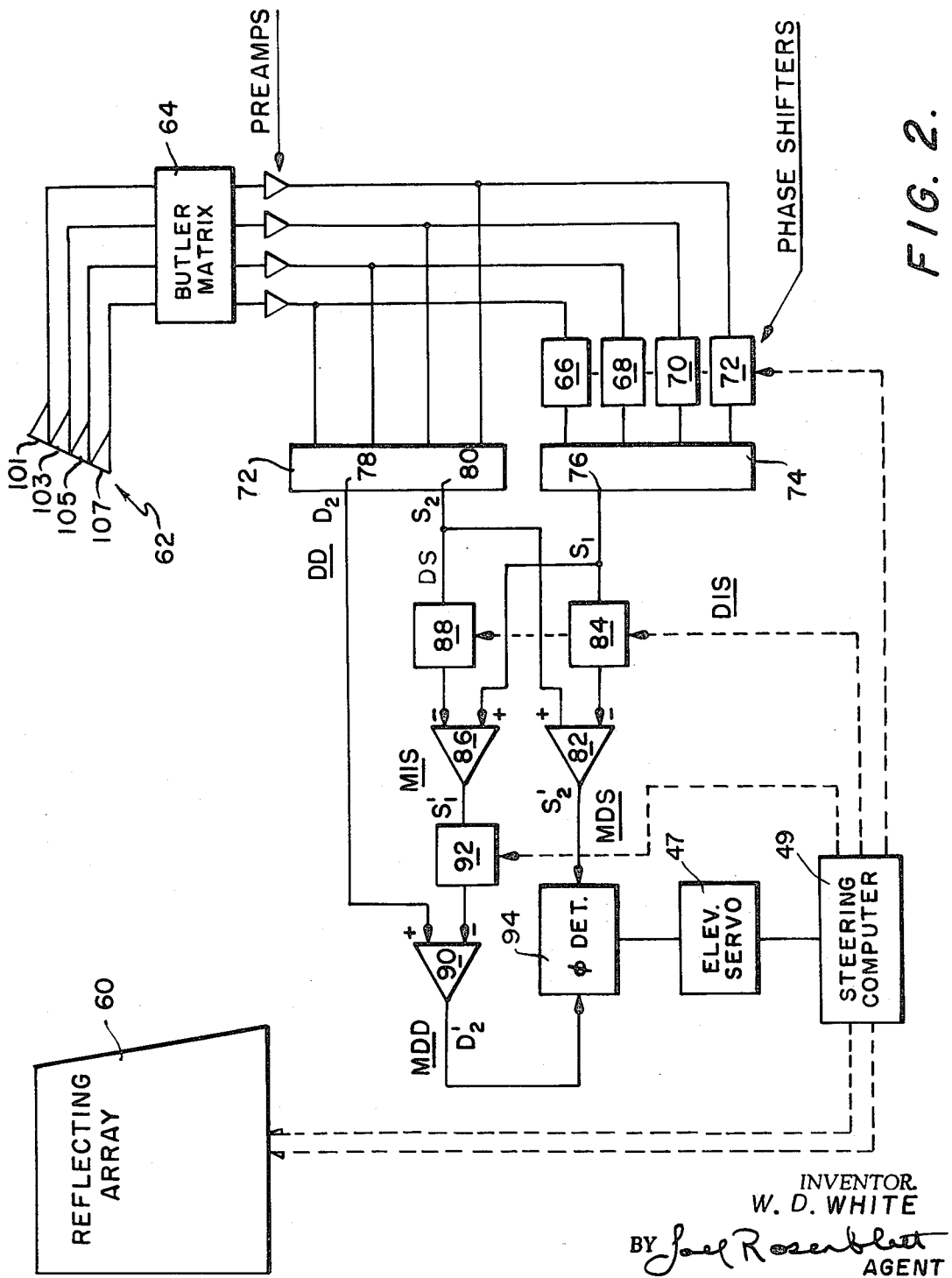
FIG. 2 shows a practical low-angle tracking system employing a reflecting array and utilizing the modified direct difference (MDD) signal and the modified direct sum (MDS) signal through a phase detector to obtain the elevation error signal.

An alternative embodiment is shown in FIG. 2 wherein the same letter designations indicate the same signals as shown in FIG. 1 and wherein the antenna includes a reflecting array 60 cooperating with a feed structure 62, comprising horns 101, 103, 105, and 107. The feed structure is aimed through the reflecting array 60 at the target. A Butler matrix 64 cooperates with the reflecting array 60 and with phase shifters 66, 68, 70, and 72 to continuously steer the image beam through the image angular range as will be explained below. Beam forming network 74, connected to phase shifters 66, 68, 70, and 72 produces the direct image signal S1 at port 76. Similarly, beam forming network 72 produces the direct difference signal D2 at port 78 and the direct sum signal S2 at port 80. The direct sum signal from port 80 is connected to the positive terminal of amplifier 82 and the direct image signal S1 as connected through attenuator 84 to the negative terminal of amplifier 82. The output of amplifier 82 is the modified direct sum signal S2'.

Similarly, the direct image sum signal S1 is connected directly to the positive terminal of amplifier 86 and the direct sum signal S2 is connected to the negative terminal of amplifier 86 through attenuating network 88. The output of amplifier 86 is the modified image sum S1' which is connected to the negative terminal of amplifier 90 through attenuator 92. The positive terminal of amplifier 90 is connected to the direct difference signal D2 and the modified direct difference signal D2' is produced at the output of amplifier 90. The modified direct difference signal D2' is phase detected together with the modified direct sum S2' and a null signal is produced at the output of phase detector 94 when the array is pointed at the correct target angle.

The steering computer 49 controls the attenuators 84, 88, and 92 and the steering of the antenna reflecting array 60 as described with regard to the first embodiment. The direct image signal sum S1 is attenuated with respect to the direct sum signal S2; the direct sum signal S2 is attenuated with respect to direct image sum signal S1; and the modified image sum signal S1' is attenuated with respect to the direct difference signal D2 as described with respect to the first embodiment.

Figure 3:
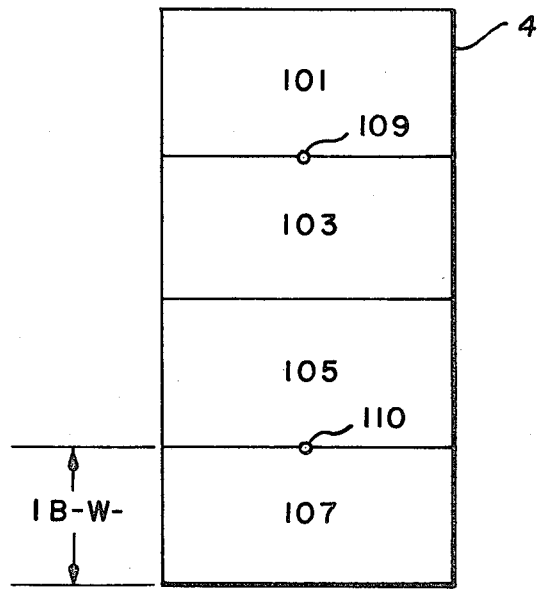
FIG. 3 shows by table and diagram the relationship of the horns at zero phase shift difference and having each one beam width.

As well known in the art, a Butler matrix operatively connected as shown in FIG. 2 to beam forming network 74 through a number of phase shifters, 66, 68, 70, and 72, and connected to four horns as in this case can selectively pass signals from a specific horn area to the beam forming network 74. For this description, the horns 101–107 are shown as each being one beam width wide in FIG. 3.

Specifically, (Table I) when the phase shift difference between each of the phase shifters 66–72 is 0° and with the Butler matrix properly connected to the feed horns 101–107 only the signal from horn 107 (FIG. 3) will be received at beam forming network 74. Similarly, when the difference in phase shift between each of the four phase shifters 66–72 is 90°, only the signal from horn 105 will be selected and passed to beam forming network 74. As further shown in Table I, in the case of 180° phase shift difference between each of the phase shifters 66–72, the result will be a signal only from horn 103 being passed through the beam forming network 74 and in the case of −90° phase shift difference between each of the phase shifters 66–72, the signal from horn 101 will be selected and passed through the beam forming network 74. Signals focused at the separation of each of the horns or at points displaced from the center of each horn may be selected by adjusting the phase shift difference in each of the phase shifters 66–72 accordingly. For example, when the reflecting array is steered at a direct signal path one beam width above the horizon, the image signal would be focused at point 110 corresponding to a separation angle from the direct path of two beamwidth.

The direct signal is always focused on point 109. Any direct signal path angle to a target displaced from the horizon at an angle equal to a beam width, for example, will result in an image signal focused on intermediate point 110 on the separation between horn 105 and 107, two beam widths displaced from point 109. The truth of this statement will be realized at once when as remembered that the separation in angle between the image signal and the direct signal must always be twice the separation between the horizon and the direct signal path as the image signal and direct signal are symmetrical about the horizon.

The method for steering the image beam is now explained below with regard to the embodiment of FIG. 2. The reflecting array 60 is steered by discreetly phase shifting each element so that a signal impinging on the antenna from an angle off the boresight and received on each of the antenna elements is phase shifted by a precise amount so that all signals received by each element are in phase. This is accomplished as described with reference to the first embodiment. The antenna in the first embodiment is steered in the image path and in the direct path by applying equal and opposite phase shifts to each antenna element path.

In the second embodiment the antenna is steered in the image path by a novel method. The feed structure 62, shown in FIG. 2, is shown in a front view in FIG. 3. It comprises four horns, each horn a beam width wide across its face as shown for horn 107. The focal point of the direct signal is at 109 on the separation between horn 101 and 103. When the reflecting array 60 is steered in the direct path, an image signal impinges on the reflecting array 60, displaced from the direct path at an angle equal to twice the angle between the direct path and the horizon. The image signal will be focused at some area comprising horns 103, 105, and 107. The focal point will be functionally related to the angle between the direct path and the horizon. The direct signal is passed through the Butler matrix 64 and the preamplifiers and conducted to direct signal beam forming network 72. The signal is fed in parallel through phase shifters 66, 68, 70, and 72, to image beam forming network 74. Each of these phase shifters 66–72 cooperate with the Butler matrix and the beam forming network 74 as described with reference to FIG. 3 to select a feed area on the surface area comprised by horns 103–107 at the image signal focal area, corresponding to the instantaneous array direct steering angle. When this is done the antenna is effectively steered in the path of the image beam as well as in the path of the direct beam.

The focal area of the image signal is always removed or displaced from the focal point 109 of the direct signal by a distance corresponding to twice the angle of displacement between the direct signal and the horizon. By properly selecting the phase shift difference between phase shifters 66–72, the correct horn corresponding to the image signal focal area can be selected.

The phase shift difference between each of the phase shifters 66–72 is maintained in a functional relationship to the phase shift and the steering direction of the reflecting array so that only a signal corresponding to the focal area of the image signal on the feed horns is selected by the Butler matrix and passed to beam forming network 74. Computer 49 is given the steering angle in the direct path and uses it to compute the corresponding focal area of the image signal on the feed structure 62. When the array is resteered, the focal point of the image signal moves across the horn feed structure either towards or away from direct signal focal point 109. The computer, given the direct signal steering angle computes the corresponding focal point on the horn array for the image signal and adjusts the phase shift difference between each of the phase shifters 66–72 to select the point on the horn array corresponding to the image focal point for a corresponding steering angle. The signal is then processed a zero or a null phase shift is produced, indicating that the antenna is in the direct path and the direct signal is uncontaminated by the image signal.

What is claimed is:

1. A low angle radar tracking system for individual angular steering alignment of a radar antenna with the correct target angle comprising;

a first means including
an antenna means steerable at an assumed direct target angle for receiving the target signals reflected through the direct and image paths and producing signals responsive to said received reflections;

a second means connected to said antenna means and having a first output signal responsive to said assumed direct path signal and second output responsive to the assumed image path signal;

third means connected to said second means for receiving said signals responsive to said direct and image signals to produce a D.C. voltage whose polarity is indicative of the angular displacement between the steered angle of said antenna means and the correct target angle.

2. The system of claim 1 wherein:

said third means includes means to compare and null said D.C. voltages when said antenna means is steered at the correct target angle.

3. The system of claim 2 wherein:

said output signal responsive to the direct path signal is a direct sum signal and a direct difference signal;

said output signals responsive to the image signal path being an image sum signal and an image difference signal; and said third means includes means to combine said image sum and said direct sum signals to form a modified image sum signal;

means to combine said direct difference signal and said modified image sum signal to form a modified direct difference signal; and means to combine said direct image sum and said direct sum signal to form a modified direct sum signal.

4. The system of claim 3 wherein:

said third means includes a phase detector;

said means for forming said modified direct difference signal being connected to a first input of said phase detector;

said means for forming a modified direct sum signal being connected to a second input of said phase detector;

said phase detector having a voltage output whose polarity is indicative of the angular displacement between the steered direction of said antenna means and the correct target path angle.

5. The system of claim 3 wherein:

said third means includes means connected to receive said image difference signal and said modified direct sum signal for forming a modified image difference signal;

said third means includes means for comparing said modified image signals and modified direct signals for indicating the angular difference between the said steered angle of a said antenna means and said correct target path angle.

6. The system of claim 5 wherein said means for comparing includes:

a plurality of phase detectors having inputs connected to receive said modified image difference signal, said modified image sum signal, said modified direct sum signal, and said modified direct difference signal;

said phase detectors having a voltage output whose polarity is indicative of the angular difference between the steered direction of said antenna means and the correct target path angle.

7. The system of claim 6 wherein:

said means for forming said modified direct sum signal includes an attenuator connected to receive said direct image sum signal for attenuating said image sum signal to an amplitude equal to the direct sum signal amplitude received at the said assumed image angle by an antenna steered at an assumed direct target angle;

means connected to receive said attenuated signal and said direct sum signal for subtracting said attenuated signal from said direct sum signal to form said modified direct sum signal;

said modified direct sum signal having a null at said steered image angle.

8. The system of claim 7 wherein:

said means for forming said modified image sum signal includes an attenuator connected to receive said direct sum signal for attenuating said direct sum signal to be equal in amplitude to the direct image sum signal amplitude received at the assumed direct angle by an antenna steered at the assumed image angle and means connected to receive said attenuated direct sum signal and said image sum signal for subtracting said attenuated signal from said image signal to form said modified image sum signal.

9. The system of claim 8 wherein:

said means for forming said modified direct difference signal includes an attenuator connected to receive said modified image sum signal;

said attenuator attenuating the amplitude of said modified image sum signal to be equal to the direct difference signal amplitude received at the assumed image angle by said antenna steered in an assumed direct signal path angle;

means connected to receive said attenuated signal and said direct difference signal for subtracting said attenuated signal from said direct difference signal to form said modified direct difference signal;

said modified direct difference signal possessing nulls at said direct and image angles.

10. The system of claim 9 wherein:

said means for forming said modified image difference signal includes an attenuator connected to receive said modified direct sum signal;

said attenuator attenuating said modified direct sum signal amplitude to be equal in amplitude to the direct image difference signal received at the assumed direct signal path angle by an antenna aligned in the assumed image signal path angle; and means connected to receive said attenuated signal and said direct image difference signal to subtract said attenuated signal from said image difference signal to form said modified image difference signal.

11. The system of claim 10 wherein:

said plurality of phase detectors includes a first and second phase detector;

the inputs of said first detector being connected to receive said modified image difference signal and said modified image sum signal;

the inputs of said second phase detector being connected to receive said modified direct sum signal and said modified direct difference signal.

12. The system of claim 11 wherein:

said antenna is a multi-array antenna;

said second means includes a plurality of phase shifters, each of said phase shifters being connected to a respective element of said array and to a first beam forming network for forming the image sum and image difference signals;

a second plurality of phase shifters, each said phase shifter connected to a respective element in said array and to a second beam forming network for forming the direct sum and difference signals;

said phase shifters steering said antenna above and below the horizon in said assumed direct and image signal paths respectively.

13. The system of claim 12 comprising:

a steering computer connected to receive the error signal output of said comparing means;

said steering computer output being connected to said phase shifters and said attenuators;

said steering computer resteering said array toward said true target angle and at a new assumed target angle in response to said error signal;

said computer being programmed with the response pattern of said array and changing the attenuation levels of said attenuators to correspond to the response pattern at the said new assumed target angle.

14. The system of claim 4 wherein:

said means for forming said modified image sum signal includes an attenuator connected to receive said direct sum signal for attenuating said direct sum signal to be equal in amplitude to the direct image sum signal received at the assumed direct angle by an antenna steered at the assumed image angle and means connected to receive said attenuated direct sum signal and said image sum signal for subtracting said attenuated signal from said image sum signal to form said modified image sum signal.

15. The system of claim 14 wherein:

said means for forming said modified direct sum signal including an attenuator connected to receive said direct image sum signal for attenuating said image sum signal to an amplitude equal to the direct sum signal amplitude received at the assumed image angle by an antenna steered at an assumed direct target angle and means connected to receive said attenuated direct image sum signal for subtracting said attenuated direct image sum signal from said direct sum signal;

said modified direct sum signal having a null at said steered image angle.

16. The system of claim 15 wherein:

said means for forming said modified direct difference signal includes an attenuator connected to receive said modified image sum signal;

said attenuator attenuating the amplitude of said modified image sum signal to be equal to the direct difference signal received at the assumed image angle by said antenna steered in the direct signal path angle and means connected to receive said attenuated and said direct difference signals to subtract said attenuated signal from said direct difference signal to form said modified direct difference signal;

said modified direct difference signal possessing nulls at said direct and image angles.

17. The system of claim 16 including:

a feed structure and means for directing said signals received by said antenna to said feed structure;

said direct signal being focused at a first point on the feed structure and said image signal being focused by said first means at a second point on said feed structure, said second point being separated from said first point by a space functionally related to the angle between the direct signal path and the horizon.

18. The system of claim 17 including:

means connected to said feed structure for selectively coupling said direct and said image signal focal areas to said third means.

19. The system of claim 18 wherein:

said means for selectively connecting said image signal focal point to said third means includes a Butler matrix having its input connected to said feed structure and its output connected to a plurality of phase shifters;

said third means including an image beam forming network having its input connected to said phase shifters;

said Butler matrix, said phase shifters, and said image beam forming network cooperating to selectively connect the instantaneous assumed focal area of said image signal on said feed structure to said image beam forming network, as the image focal point changes in response to a changing steering angle or target angle.

20. The system of claim 19 wherein:

said feed structure is an array of feed horns;

said direct signal focal area being stationary;

said horns being arranged in a line, with each horn sharing a common wall with an adjacent horn; and said instantaneous image focal area selected being functionally related to the quantity of phase shift between each of said phase shifters connected to said Butler matrix.

21. The system of claim 20 wherein:

said horn array includes first, second, third, and fourth horns;

said fourth horn being coupled to said beam forming network when said phae shift difference is zero;

said adjacent areas of said third horn and said fourth horn being selected when said phase shift difference is 45°;

said third horn being selected when said phase shift difference is 90°;

said adjacent areas of said third horn and said second horn being selected when said phase shift difference is 135°;

said second horn being selected when said phase shift difference is 180°.

22. The system of claim 21 comprising:

a steering computer connected to receive the error signal output of said comparing means;

said steering computer being connected to said phase detectors and said attenuators;

said steering computer resteering said array at a new assumed direct angle and toward said true target angle in response to said error signal;

said computer being programmed with the response pattern of said array and changing the attenuating levels of said attenuators responsive to said new steered angle, to said error signal.

23. A system for separating and selectively connecting at direct and image path radar signals reflected from a target and received by an antenna comprising:

antenna means for receiving said direct and image signals;

a feed structure;

a first means connected to said antenna means for steering said antenna means in the direction of said direct signal path and for directing said received signals to said feed structure;

said direct signal being focused by said first means at a first area on the feed structure and said image signal being focused by said first means at a second area on said feed structure;

said second area being separated from said first area by a space functionally related to the angle between the direct signal path and the horizon.

24. The system of claim 23 including:

means connected to said feed structure for selectively extracting said direct and said image signals from their respective focal areas and separately producing each said signal at a respective output.

25. The system of claim 24 wherein:

said means for selectively extracting said image signal focal area includes a Butler matrix having its input connected to said feed structure, a plurality of phase shifters having their inputs connected to said Butler matrix, and an image beam forming network having its inputs connected to said phase shifter outputs;

said Butler matrix, said phase shifters, and said image beam forming network cooperating to selectively connect the instantaneous focal area of said image signal on said feed structure to said image beam forming network as the image focal point changes in response to a changing steering angle or target angle.

26. The system of claim 25 wherein:

said feed structure is an array of feed horns;

said direct signal focal area being a stationary area on said horn array;

said horns being arranged in a line with each horn having a common wall with an adjacent horn; and said image focal area selected being functionally related to the quantity of phase shift between each of said phase shifters.

27. The system of claim 26 wherein:

said horn array includes a first, second, third, and fourth horns;

said fourth horn being coupled to said image beam forming network when said phase shift difference is zero;

said adjacent areas of said third horn and said fourth horn being coupled to said image beam forming network when said phase shift difference is 45°;

said third horn being coupled to said image beam forming network when said phase shift difference is 90°;

said adjacent area between said third horn and said second horn being coupled to said image beam forming network when said phase shift difference is 135°;

said second horn being coupled to said image beam forming network when said phase shift difference is 180°.

* * * * *